(12) United States Patent
Tang et al.

(10) Patent No.: US 7,755,327 B2
(45) Date of Patent: Jul. 13, 2010

(54) SYNCHRONOUS RECTIFICATION TYPE BATTERY CHARGING CIRCUIT AND PROTECTION CIRCUIT THEREOF

(75) Inventors: Zhijie Tang, Shenzhen (CN); Guang Li, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 544 days.

(21) Appl. No.: 11/858,756

(22) Filed: Sep. 20, 2007

(65) Prior Publication Data

US 2008/0106236 A1 May 8, 2008

(30) Foreign Application Priority Data

Nov. 8, 2006 (CN) .......................... 2006 1 0063544

(51) Int. Cl.
*H01M 10/46* (2006.01)
(52) U.S. Cl. ...................................... 320/134
(58) Field of Classification Search ................. 320/107, 320/112, 128, 134, 136, 163
See application file for complete search history.

(56) References Cited

U.S. PATENT DOCUMENTS 6,137,267 A * 10/2000 Kates et al. ................. 320/136

2006/0097707 A1 * 5/2006 Inoshita et al. ............... 323/222

FOREIGN PATENT DOCUMENTS

| CN | 2347302 Y | 11/1999 |
| CN | 1645726 | 7/2005 |
| EP | 1 521 354 | 4/2005 |
| JP | 2001-128369 | 5/2001 |
| JP | 2006230066 A1 | 8/2006 |

* cited by examiner

*Primary Examiner*—Edward Tso
(74) *Attorney, Agent, or Firm*—Kory D. Christensen; Stoel Rives LLP

(57) ABSTRACT

The present invention discloses a synchronous rectification type battery charging circuit, comprising: a charging main circuit for charging a battery; an anti-reflection switch tube, connected between a voltage input of the synchronous rectification type battery charging circuit and the charging main circuit; and a control logic and driving circuit, for controlling turning-on and cutting-off of the charging main circuit and the anti-reflection switch tube, characterized in that the synchronous rectification type battery charging circuit further including a protection circuit which outputs to the control logic and driving circuit an indicating signal for representing turning-on or cutting-off of the charging main circuit and the anti-reflection switch tube, according to a value of an input voltage of the synchronous rectification type battery charging circuit.

17 Claims, 3 Drawing Sheets

SYNCHRONOUS RECTIFICATION TYPE BATTERY CHARGING CIRCUIT AND PROTECTION CIRCUIT THEREOF

TECHNICAL FIELD

This invention relates to a battery charging circuit, and specially, to a synchronous rectification type battery charging circuit and its protection circuit.

BACKGROUND OF THE INVENTION

The chargeable lithium-ion battery has been used widely in portable devices. Currently, each large chip manufacturing company has its own dedicated lithium-ion battery charging chips to charge a lithium-ion battery formed by single or multi cells in series. Currently, most of the charging solutions use BUCK type topology, as shown in FIG. 1. The circuit has simple structure and high efficiency.

To further improve the efficiency, synchronous rectification technology is more and more widely used in charging circuits. FIG. 2 is a BUCK type charging circuit using synchronous rectification technology. For the charging circuit of FIG. 2, the switch S1 and the diode D2 shown in FIG. 1 are replaced with MOSFET respectively, which effectively reduces a the on-state loss caused by a positive on-state voltage drop of a diode and usually achieve an efficiency of more than 90%. Moreover, in order to further reduce the volume and the number of elements for the charging circuit, some charging management chips have integrated the switch devices inside the chip.

Since the battery is different from the common loads and is equivalent to a direct current supply, when the BUCK type synchronous rectification circuit charges the lithium-ion battery formed by the multi battery cells in series, the input voltage of the charging circuit is higher than that of the charged battery because the voltage of the charged battery is higher. At that time, the current of the battery will reflect to the input of the charging circuit if the anti-reflect MOSFET Q3 and the charging circuit can not be cut off in time when the direct current input powers down or voltage sag occurs. The energy of the inverse current may be from the charged battery or the output energy storage capacitance C2, and the reflected inverse current flows through L1. Here, if the synchronous rectification circuit is not cut off, the synchronous rectification circuit will keep working. In the case that there is an inverse current appearing in an inductance, if the synchronous rectification circuit keeps working, it will cause the synchronous rectifier Q2 to be short-circuit relative to the ground during the synchronous continuous current. A too large short-circuit current will impair Q2 instantaneously, which thereby further cause impairments to Q1 and Q3. If Q1~Q3 are integrated inside the charging chip, it will directly damage the chip. Therefore, the anti-reflection MOSFET and the charging circuit must be cut off immediately after the input voltage is falling, to prevent the charging circuit from being damaged when the voltage reflected.

Currently, there are two ways to cut off the charging circuit in time:

1) A diode or a control switch is inserted serially to the main loop of the charging circuit, as shown in the solution realized by D1 of FIG. 3 and FIG. 4, which prevents battery voltage reflection, however, this method lead to low efficiency due to a large positive voltage drop of the diode. In order to improve the efficiency, a MOSFET (i.e. Field Effect Transistor) is added in parallel to the anti-reflection diode. Although this method is reliable to accomplish cutting off the diode automatically, it cannot achieve high efficiency because of a high positive voltage drop of the diode, and it is difficult to make the miniaturization and modularization of the charging circuit because of the heating generated by the diode.

2) The method for comparing the battery voltage and the input voltage is applied. As shown in FIG. 5, when the input voltage is $\Delta V$ higher than the battery voltage and $\Delta V$ is less than 75 mV, the control circuit will enter to a sleeping mode in which the anti-reflection MOSFET and the charging circuit are cut off, and once $\Delta V$ is larger than 75 mV, the entire circuit will be waken up, wherein the anti-reflection MOSFET is turned on again and the synchronous rectification circuit keeps working. However, the battery voltage and the input voltage applied in this method are both floating voltage and the comparing threshold is only 75 mV. Since the battery voltage and the input voltage can not be judged correctly because the battery voltage and the input voltage both have ripple when they are working, and a sampling circuit of the battery voltage has certain delay, this method can not provide a effective cutting-off to the anti-reflection MOSFET and the charging circuit in time which makes it less reliable, thus to increase the risk that the anti-reflection MOSFET Q3 and the charging circuit are damaged. In practical, this risk increases with the increase of the number of the charged batteries that are connected serially.

SUMMARY OF THE INVENTION

An object of the present invention is to solve the above problem of the prior art, by providing a synchronous rectification type battery charging circuit in which the anti-reflection switch tube and the charging main circuit of synchronous rectification type battery charging circuit are cut off in time and effectively when the input voltage of the charging circuit reduces to a predetermined threshold value.

Another object of the present invention is to provide a protection circuit for the synchronous rectification type battery charging circuit. The protection circuit detects the input voltage of the charging circuit and cuts off the anti-reflection switch tube and the charging main circuit of the synchronous rectification type battery charging circuit in time and effectively when the input voltage of the charging circuit reduces to a predetermined threshold value.

In order to achieve the above objects, the present invention provides a synchronous rectification type battery charging circuit, comprising:

a charging main circuit for charging a battery;

an anti-reflection switch tube, connected between a voltage input of the synchronous rectification type battery charging circuit and the charging main circuit; and a control logic and driving circuit, for controlling turning-on and cutting-off of the charging main circuit and the anti-reflection switch tube, characterized in that the synchronous rectification type battery charging circuit further including a protection circuit which outputs to the control logic and driving circuit an indicating signal for representing turning-on or cutting-off of the charging main circuit and the anti-reflection switch tube, according to a value of an input voltage of the synchronous rectification type battery charging circuit.

In order to achieve the above objects, the present invention proposes a protection circuit for a synchronous rectification type battery charging circuit, comprising:

an input voltage detecting unit, for detecting a value of an input voltage of the synchronous rectification type battery charging circuit; and a instruction output unit, for outputting to the synchronous rectification type battery charging circuit an indicating signal which represents whether an operation of preventing charging voltage from reflecting is not performed or is performed, according to whether the detected value of the input voltage is larger or less than a predetermined threshold voltage.

The advantageous effects of the prevent invention: the present invention introduces to the charging circuit a fast intelligent cutting-off circuit which can realize a real time detection for the input voltage, while the threshold value controlling the charging circuit is a fixed value slightly larger than the largest charging voltage of the battery. The charging circuit can be controlled in advance before the input voltage falls below the battery voltage, which makes switch tubes of the charging loop to be cut off fast, prevents the reflection of the voltage and the current of the battery and avoids a damage to the charging circuit and the battery, and greatly promotes the reliability of the charging circuit. The circuit of the present invention is simple in structures, has strong practicability, and has lower loss when it works which will not affect the charging efficiency.

BRIEF DESCRIPTION OF THE DRAWINGS

The features and advantages of the present invention will be discussed in conjunction with the accompanying drawings. In the drawings.

PREFERRED EMBODIMENTS OF THE INVENTION

The key of the present invention is to add a protection circuit for controlling turning-on and cutting-off of the synchronous rectification type battery charging circuit. The protection circuit detects a value of the input voltage of the battery charging circuit, compares the detected input voltage with a predetermined threshold value Vth, outputs a first signal when the input voltage is below the predetermined threshold value Vth so that the anti-reflection switch tube and the charging main circuit of the battery charging circuit are cut off and the battery charging circuit and the battery are thus protected effectively, and outputs a second signal When the input voltage is larger than the predetermined threshold value Vth so that the anti-reflection switch tube and the charging main circuit are turned on.

The First Embodiment

Figure 1:
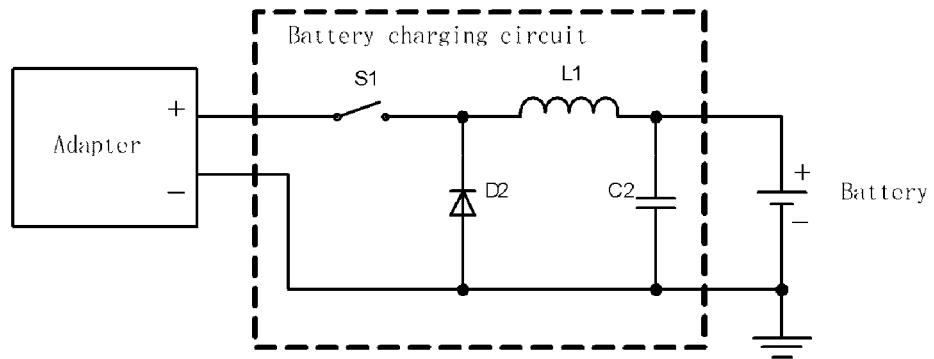
FIG. 1 shows a battery charging circuit with BUCK type topology structure.
Figure 2:
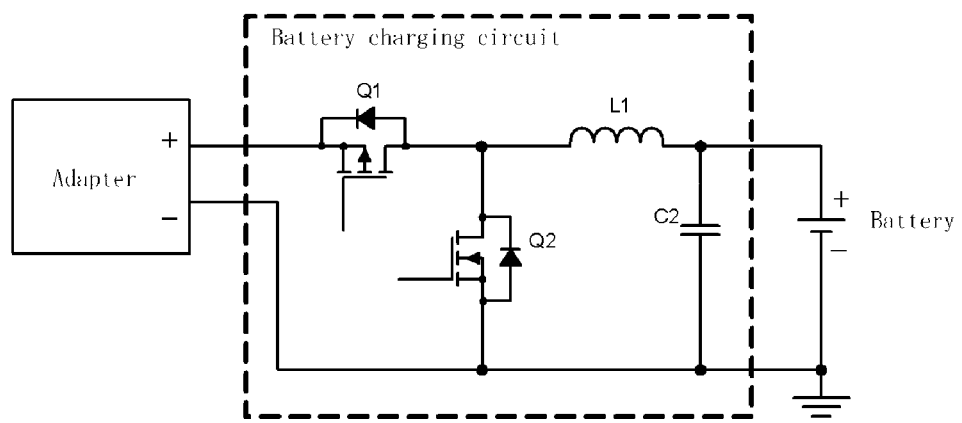
FIG. 2 shows a BUCK type charging circuit using the synchronous rectification technology.
Figure 3:
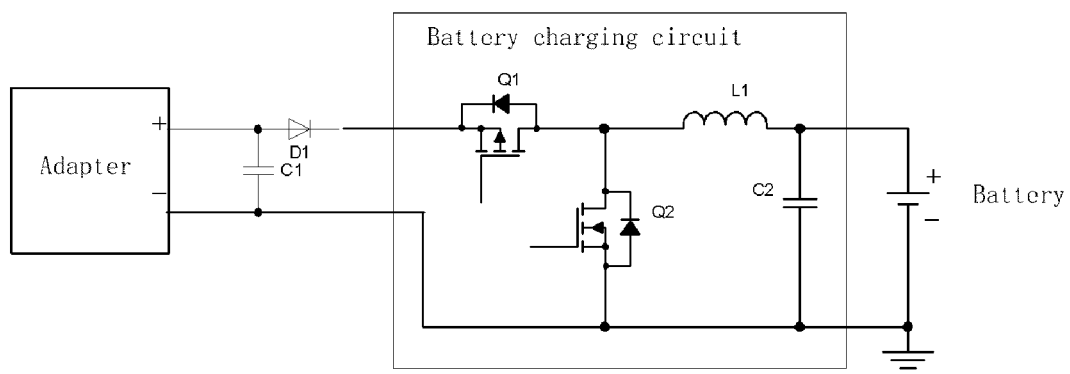
FIG. 3 shows a circuit diagram applying a diode to prevent the reflection from the battery voltage to the input side.
Figure 4:
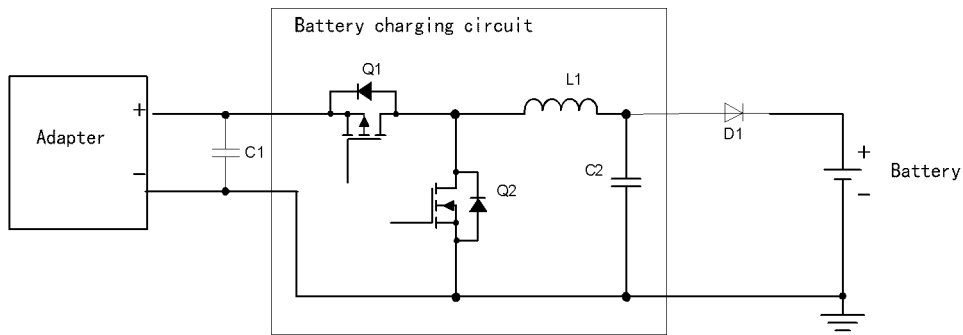
FIG. 4 shows another circuit diagram applying a diode to prevent the reflection from the battery voltage to the input side.
Figure 5:
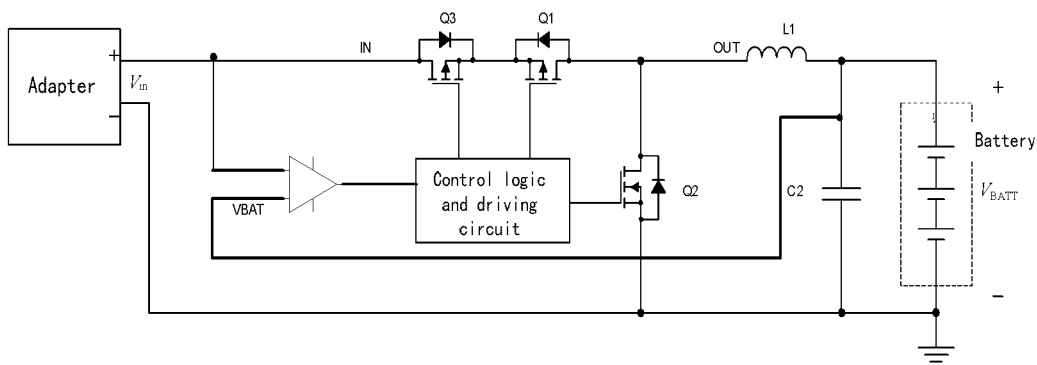
FIG. 5 shows a circuit diagram using a sleeping mode to prevent the reflection of battery voltage.
Figure 6:
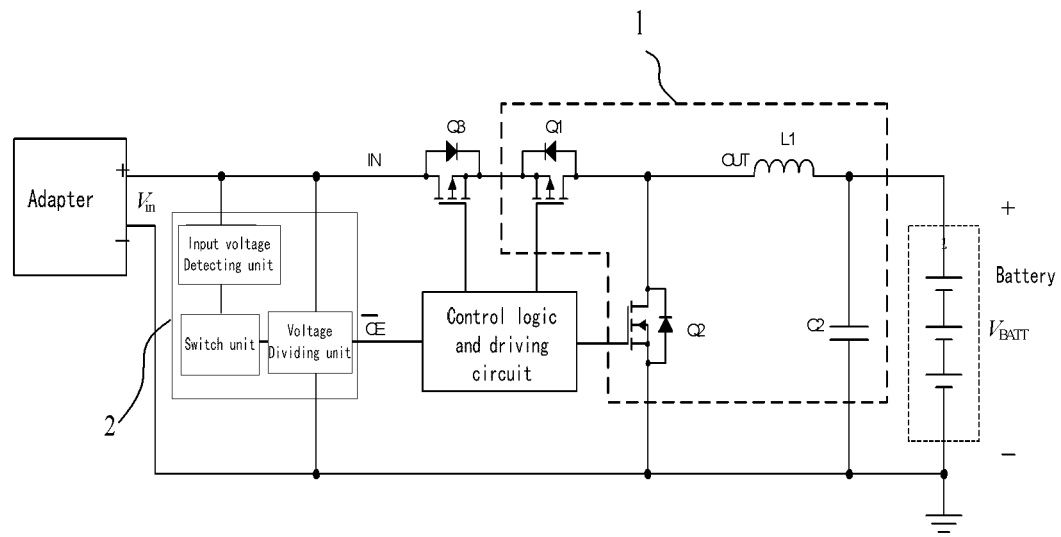
FIG. 6 shows a schematic diagram of preventing reflection of battery voltage according to the present invention.

The synchronous rectification type battery charging circuit comprises a charging main circuit 1, an anti-reflection switch tube Q3, a control logic and driving circuit and a protection circuit 2. The an anti-reflection switch tube Q3 is connected between a power supply adapter and the charging main circuit 1, and the control logic and driving circuit generates a control signal to control turning-on and cutting-off of the charging main circuit 1 and the anti-reflection switch tube Q3. An implementation of the protection circuit is shown in FIG. 6. As shown in FIG. 6, with the maximal charging voltage $V_{BATT\text{-}max}$ of the charged battery as the initial detecting voltage value V1 and a predetermined margin V2 of the voltage sag or power-off of the battery charging circuit, by using a voltage detecting circuit whose detecting point is Vth=V1+V2, the protection circuit based on a switch device is formed, so that when the input voltage of the battery charging circuit falls to Vth, the anti-reflection switch tube Q3 and the charging main circuit are cut off automatically, and thus the risk of the reflection of battery voltage is avoided effectively and the battery charging circuit and the battery are protected.

The protection circuit comprises an input voltage detecting unit, a switch unit and a voltage dividing unit. The input voltage detecting unit, which is connected to the input of the battery charging circuit, detects the input voltage Vin in real time and provides to the switch unit a voltage for controlling turning-on and cutting-off of the switch unit. The output of the switch unit is connected to the enable terminal $\overline{CE}$ of the control logic and driving circuit, and the voltage dividing point of the voltage dividing unit. The voltage dividing unit is connected between the ground and the input of the battery charging circuit.

When the input voltage detecting unit detects that the input voltage Vin of the battery charging circuit falls to the predetermined cutting-off threshold value Vth, the switch unit cuts off immediately to cause $\overline{CE}$ to be high level immediately, and the control logic and driving circuit cuts off the switch device of the charging main circuit and the anti-reflection switch tube Q3. For the purpose of protection, the battery charging circuit must be cut off before Vin falls to battery voltage $V_{BATT}$, i.e. $V_{BATT}$<Vth<Vin, so that the switch device Q1, Q2 of the charging main circuit and the anti-reflection switch tube Q3 can be cut off in time to prevent battery current from reflecting to the main loop; meanwhile, for the purpose of effective protection, the threshold value Vth can be set to be the maximal charging voltage $V_{BATT\text{-}max}$ of the charged battery plus the margin of the power-off of the battery charging circuit. On the other hand, when the input voltage Vin rises to be larger than the threshold value Vth, the switch unit turns on, to cause $\overline{CE}$ to be low level and to cause the battery charging circuit to begin working.

Figure 7:
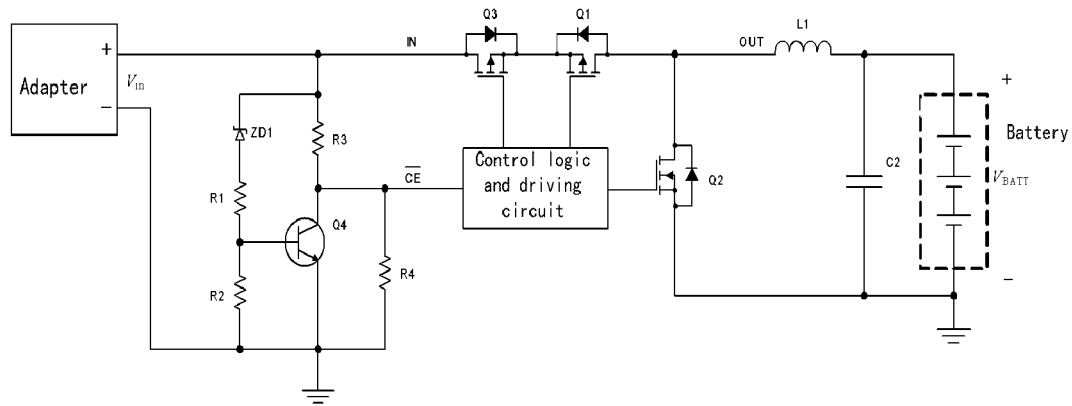
FIG. 7 shows a circuit diagram according to an embodiment of the present invention.

A specific implementation of the protection circuit is shown in FIG. 7. The input voltage detecting unit includes an inversed voltage regulator tube ZD1 and a first resistance that are serially connected in sequence between the input of the battery charging circuit and the ground. The first resistance may be a resistance, or be two resistances R1, R2 in serial as shown in FIG. 7. The switch unit is a transistor Q4, and the anode of the voltage regulator tube ZD1 is coupled to the control electrode of the transistor Q4 directly or indirectly (i.e. through other elements such as a resistance). In FIG. 7, the control electrode of the transistor Q4 is directly connected between resistance R1 and resistance R2. The voltage dividing unit is a resistance connected serially between the input of the battery charging circuit and the ground.

Transistor Q4 may use a MOS tube or a triode. When transistor Q4 is MOS tube, its control electrode is the grid of the MOS tube, when transistor Q4 is a triode, its control electrode is the base of the triode. Likely, the anti-reflection switch tube Q3 also may use a MOS tube or a triode.

The following describes the working principle of the present embodiment by taking the transistor Q4 with a triode as an example. After the power supply adapter begins to work, the input voltage Vin of the battery charging circuit gradually rises. When Vin rises to the predetermined threshold voltage Vth, the voltage regulator tube ZD1 is turned on and then Vin acts on the transistor Q4 by dividing voltage of resistance R1 and resistance R2. When the base voltage of transistor Q4 rises to 0.6~0.7V, transistor Q4 is turned on, and thus the enable control terminal end $\overline{CE}$ of the control logic and driving circuit is pulled down to low level. Then, the control logic and driving circuit triggers the turning-on of the anti-reflection switch tube Q3 and the charging main circuit 1, and thus the battery charging circuit begins to work. It's required that the threshold value Vth is larger than the maximal charging voltage $V_{BATT-max}$ of the charged battery. Moreover, the margin V2 of the voltage sag or power-off of the battery charging circuit is set, here, V2=2V, so Vth=$V_{BATT-max}$+V2. The predetermined threshold voltage Vth is the sum of the on-state voltage drop of the voltage regulator tube ZD1, the voltage drop of R1 and the voltage drop between the base and the emitter of transistor Q4. When the threshold voltage Vth is determined, the threshold value can be achieved by choosing the suitable voltage regulator tube ZD1 and the suitable resistance R1, i.e. the on-state voltage of the voltage regulator tube ZD1 must be less than the threshold voltage Vth and resistance R1 may be zero. When resistance R1 is zero, the value of the threshold voltage Vth is the sum of the on-state voltage drop of the voltage regulator tube ZD1 and the voltage drop between the base and the emitter of transistor Q4.

When the power supply adapter operates, the protection circuit has lower loss, and thus its influence on the efficiency of the battery charging circuit can be skipped.

When the power supply adapter stops outputting, powers off or occurs a voltage sag, the input voltage Vin of the battery charging circuit gradually decreases. When the input voltage Vin of the battery charging circuit falls below the threshold voltage Vth, transistor Q4 will cut off if its base voltage is no longer between 0.6~0.7V, and the voltage Vin is then divided by resistance R3 and resistance R4 of the voltage dividing unit to cause $\overline{CE}$ to be high level. Then, Q1~Q3 cut off immediately to prevent the battery voltage current from reflecting to the battery charging circuit, so as to protect the battery charging circuit and the battery. If the battery charging circuit is integrated inside a chip, the chip can be protected.

The present embodiment can make use of fast switch character of the triode to make the protecting behaviors without delay and to guarantee the swiftness and promptness of the switch.

The protection circuit of the present embodiment can also be integrated inside a chip partly or entirely, or can be integrated inside a chip together with the charging circuit.

The Second Embodiment

Figure 8:
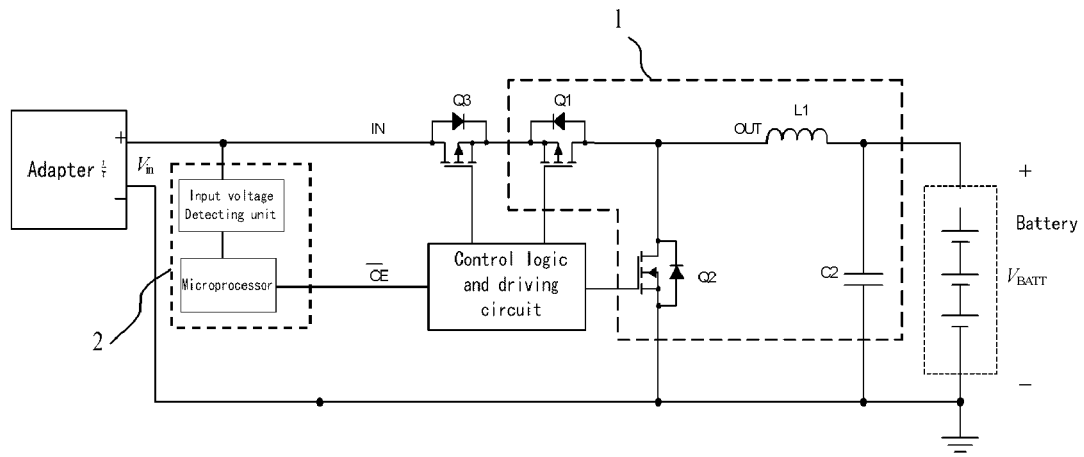
FIG. 8 shows a circuit diagram according to another embodiment of the present invention.

The protection circuit of the present invention also can be implemented by the method shown in FIG. 8. That is, the threshold voltage and the comparing and control program are first written into a microprocessor; after the input voltage detecting unit inputs to the microprocessor the input voltage detected in real time, the microprocessor then compares the detected input voltage with the threshold voltage, and outputs the corresponding high level or low level to the control logic and driving circuit according to the comparison result. The response and control method of the enable terminal of the control logic and driving circuit for high level and low level is the same as that of the first embodiment.

To sum up, the present invention can actively detect whether the input voltage of the battery charging circuit is power off, and automatically judge whether the input voltage arrives at a predetermined voltage. Moreover, the present invention has a character of prompt response, can prevent the battery voltage from reflecting to the battery charging circuit and thus effectively protect the battery charging circuit and the charged battery.

What is claimed is:

1. A synchronous rectification type battery charging circuit, comprising:
   a charging main circuit for charging a battery;
   an anti-reflection switch tube, connected between a voltage input of the synchronous rectification type battery charging circuit and the charging main circuit; and
   a control logic and driving circuit, for controlling turning-on and cutting-off of the charging main circuit and the anti-reflection switch tube,
   characterized in that the synchronous rectification type battery charging circuit further including a protection circuit which outputs to the control logic and driving circuit an indicating signal for representing turning-on or cutting-off of the charging main circuit and the anti-reflection switch tube, according to a value of an input voltage of the synchronous rectification type battery charging circuit.

2. The synchronous rectification type battery charging circuit according to claim 1, wherein the protection circuit further comprises:
   an input voltage detecting unit, for detecting the value of the input voltage; and
   an instruction output unit, for outputting to the control logic and driving circuit an indicating signal which represents turning-on or cutting-off of the charging main circuit and the anti-reflection switch tube, according to whether the detected value of the input voltage is larger or less than a predetermined threshold voltage.

3. The synchronous rectification type battery charging circuit according to claim 2, wherein the instruction output unit further comprises:
   a switch unit which turns on or cuts off according to whether the detected value of the input voltage is larger or less than the predetermined threshold voltage; and
   a voltage dividing unit which outputs to the control logic and driving circuit an indicating signal for representing turning-on or cutting-off of the charging main circuit and the anti-reflection switch tube, according to the turning-on or the cutting-off of the switch unit.

4. The synchronous rectification type battery charging circuit according to claim 3, wherein
   the input voltage detecting unit includes a voltage regulator tube and a resistance that are serially connected in sequence between the voltage input of the synchronous rectification type battery charging circuit and the ground,
   the switch unit includes a transistor whose control electrode is connected between the voltage regulator tube and the resistance, and
   a voltage dividing point of the voltage dividing unit is connected to the output of the transistor and the control logic and driving circuit.

5. The synchronous rectification type battery charging circuit according to claim 4, wherein the sum of an on-state voltage drop and a voltage drop of the transistor is less than or equal to the predetermined threshold voltage.

6. The synchronous rectification type battery charging circuit according to claim 4, wherein additional resistances are connected serially between the voltage regulator tube and the resistance, and the control electrode of the transistor is connected between the resistance and the additional resistances.

7. The synchronous rectification type battery charging circuit according to claim 6, wherein the sum of an on-state voltage drop of the voltage regulator tube, a voltage drop of the additional resistances and a voltage drop of the transistor is less than or equal to the predetermined threshold voltage.

8. The synchronous rectification type battery charging circuit according to claim 2, wherein the instruction output unit is realized by a microprocessor.

9. The synchronous rectification type battery charging circuit according to claim 2, wherein the predetermined threshold voltage substantially equal to the sum of the maximal charging voltage of the battery and the margin of the voltage sag or the power-off of the synchronous rectification type battery charging circuit.

10. A protection circuit for a synchronous rectification type battery charging circuit, comprising:
    an input voltage detecting unit, for detecting a value of an input voltage of the synchronous rectification type battery charging circuit; and
    an instruction output unit, for outputting to the synchronous rectification type battery charging circuit an indicating signal which represents whether an operation of preventing charging voltage from reflecting is not performed or is performed, according to whether the detected value of the input voltage is larger or less than a predetermined threshold voltage.

11. The protection circuit according to claim 10, wherein the instruction unit further comprising:
    a switch unit which turns on or cuts off according to whether the detected value of the input voltage is larger or less than the predetermined threshold voltage; and
    a voltage dividing unit which outputs to the synchronous rectification type battery charging circuit an indicating signal which represents whether an operation of preventing charging voltage from reflecting is not performed or is performed, according to the turning-on or the cutting-off of the switch unit.

12. The protection circuit according to claim 11, wherein the input voltage detecting unit comprising a voltage regulator tube and a resistance that are serially connected in sequence between the voltage input of the synchronous rectification type battery charging circuit and the ground,
    the switch unit comprising a transistor whose control electrode is connected between the voltage regulator tube and the resistance, and
    a voltage dividing point of the voltage dividing unit is connected to the control logic and driving circuit and the output of the transistor.

13. The protection circuit according to claim 12, wherein the sum of an on-state voltage drop and a voltage drop of the transistor is less than or equal to the predetermined threshold voltage.

14. The protection circuit according to claim 12, wherein additional resistances are connected serially between the voltage regulator tube and the resistance, and the control electrode of the transistor is connected between the resistance and the additional resistances.

15. The protection circuit according to claim 14, wherein the sum of an on-state voltage drop of the voltage regulator tube, a voltage drop of the additional resistances and a voltage drop of the transistor is less than or equal to the predetermined threshold voltage.

16. The protection circuit according to claim 10, wherein the instruction output unit is realized by a microprocessor.

17. The protection circuit according to claim 10, wherein the predetermined threshold voltage substantially equal to the sum of the maximal charging voltage of a battery charged by the synchronous rectification type battery charging circuit and a margin of voltage sag or power-off of the synchronous rectification type battery charging circuit.

* * * * *